US006335113B1

(12) United States Patent
Nakatani et al.

(10) Patent No.: US 6,335,113 B1
(45) Date of Patent: Jan. 1, 2002

(54) THERMOSTAT AND BATTERY PACK CONTAINING THE THERMOSTAT

(75) Inventors: Kensuke Nakatani, Sumoto; Yoshiharu Takasaki, Ibi-gun; Takao Takatsu, Tsuna-gun; Kazuo Osaki, Mihara-gun, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/537,678

(22) Filed: Mar. 29, 2000

(30) Foreign Application Priority Data

Mar. 31, 1999 (JP) ........................................... 10-090965

(51) Int. Cl.[7] ............................................... H01M 10/48

(52) U.S. Cl. ............................... 429/90; 429/93; 429/7; 337/3; 337/333

(58) Field of Search .............................. 429/90, 92, 93, 429/7, 54, 62, 100; 337/3, 333

(56) References Cited

U.S. PATENT DOCUMENTS 3,170,998 A * 2/1965 Stahl
4,345,389 A * 8/1982 Balchunas
4,894,634 A * 1/1990 Nezuka et al.
5,578,982 A * 11/1996 Serigny
5,659,285 A * 8/1997 Takeda
5,804,798 A * 9/1998 Takeda
5,847,637 A * 12/1998 Takeda et al.
6,265,961 B1 * 7/2001 Takeda .................................

* cited by examiner

*Primary Examiner*—Tom Dunn
*Assistant Examiner*—Jonathan Johnson
(74) *Attorney, Agent, or Firm*—Wenderoth, Lind & Ponack, L.L.P.

(57) ABSTRACT

A thermostat comprises a first laminated metal plate and a second laminated metal plate in which a plurality of metal layers having different rates of expansion are laminated. The first laminated metal plate has a movable contact. The second laminated metal plate is disposed in such a position as to put the first laminated metal plate to the off and on positions. The first and second off temperatures, which put the movable contact in the off position by causing the first and second laminated metal plates to deform, and the first and second return temperatures, which return the movable contact from the off position to the on position, are set respectively at different temperatures.

28 Claims, 6 Drawing Sheets

THERMOSTAT AND BATTERY PACK CONTAINING THE THERMOSTAT

This application is based on application No.11-90965 filed in Japan on Mar. 31, 1999, the content of which incorporated hereinto by reference.

BACKGROUND OF THE INVENTION

This invention relates to a thermostat that cuts off electrical current when the ambient temperature exceeds a set temperature and to a battery pack that contains the thermostat. In particular, this invention relates to a thermostat in which the thermostat return temperature when the ambient temperature drops after it has reached a high temperature and current has been cut off can be varied depending on the rising temperature and to a battery pack that contains the thermostat.

A thermostat which cuts off current when the ambient temperature exceeds a set temperature is housed, for example, in a battery pack, and cuts off current to protect the batteries when the temperature exceeds a set temperature. Further, the thermostat is housed not only in a battery pack but also an electric appliance containing a heater. The thermostat housed in an electric appliance cuts off current when the ambient temperature exceeds a set temperature and returns to the on state and turns on current when the ambient temperature drops.

The thermostat cuts off current when the ambient temperature exceeds a set temperature, and then it returns to the on state and turns on current when the temperature drops. When the ambient temperature becomes even higher than a set temperature due to an accident to a battery pack and an electric appliance, current should be maintained in a cut-off state for safety's sake. To realize this, a thermostat and a thermal fuse are combined to use. The blowout temperature of thermal fuse is set at a higher temperature than the thermostat cut-off temperature. When the ambient temperature becomes abnormally higher than a set temperature, the thermal fuse is blown out and current is maintained in the cutoff state.

This circuit is safe to use, but has the drawback that parts assembling requires much time and labor and the manufacturing cost is high because two parts of the thermostat and fuse are installed, and also it is difficult to miniaturize because the two parts are installed respectively.

To solve these problems, a thermostat that maintains current in the cut-off state after the ambient temperature has risen abnormally was developed (Japanese Non-examined Patent Publication HEI 8-7729). As shown in a cross-section view of FIG. 1, a thermostat described in this publication contains fuse springs 9. The fuse springs 9 are fixed by thermal deformation materials 10 such as an alloy easily melted and synthetic resin. When the thermal deformation material 10 of synthetic resin fixing the fuse springs 9 is heated to a higher temperature than the thermostat cut-off temperature, it can not maintain the fuse springs 9 due to deformation. When the thermal deformation material 10 becomes in this state, the fuse springs 9 push a movable contact 3, and the thermostat is maintained in the off state. The number of 4 shows a fixed contact in this figure.

The thermostat, shown in FIG. 1, maintains the movable contact 3 in the off state when the thermal deformation material 10 can not maintain the fuse springs 9 due to thermal deformation. Therefore, the thermostat can be so structured as not to return to the on state when the ambient temperature rises abnormally. However, a thermostat with this structure requires thermal deformation materials such as an alloy easily melted and synthetic resin which deform surely to disengage a fixed condition of the fuse springs when the ambient temperature exceeds a set temperature. For this reason, the manufacturing cost is increased. Further, it is necessary for the thermal deformation material to maintain the fuse springs firmly when the ambient temperature is lower than a set temperature. However, the thermal deformation material gets to deform easily due to repetition of being heated almost to a set temperature and has trouble with long-term reliability. Still further, the thermostat has the drawback that it is impossible to test repeatedly the thermal deformation material for the temperature when a fixed condition of the fuse springs is disengaged because the thermal deformation material can not return to its original shape once it has be en deformed by being heated. In addition to that, the thermostat has another drawback t hat the cost of parts is high and miniaturization is difficult since both of the fuse springs and thermal deformation material are housed therein.

The present invention was developed to solve these problems. It is thus a primary object of the present invention to provide a thermostat that can solve above-mentioned problems and a battery pack that contains the thermostat.

The above and further object of the invention will be more fully be apparent from the following detailed description with accompanying drawings,

SUMMARY OF THE INVENTION

The thermostat of the present invention comprises a first laminated metal plate and a second laminated metal plate in which a plurality of metal layers having different rates of expansion are laminated. The first laminated metal plate has a movable contact. The second laminated metal plate is disposed in such a position as to put the first laminated metal plate in the off and on positions. The first off temperature and the second off temperature, which put the movable contact in the off position by causing the first and second laminated metal plates to deform, and the first return temperature and the second return temperature, which return the movable contact from the off position to the on position, are set respectively at different temperatures.

The thermostat of the present invention comprises the first laminated metal plate 1 and the second laminated metal plate 2 having the following structures:

(a) The first laminated metal plate 1 having the movable contact 3 becomes in the on state by causing the movable contact 3 to come in contact with a fixed contact 4 and becomes in the off state by separating the movable contact 3 from the fixed contact 4.

(b) When the ambient temperature exceeds the first off temperature, the first laminated metal plate 1 thermally deforms in the direction which the movable contact 3 is separated from the fixed contact 4, (c) When the temperature falls below the first return temperature, a thermal deformation force acts on the first laminated metal plate 1 in the direction which the movable contact 3 comes in contact with the fixed contact 4.

(d) The second laminated metal plate 2 is disposed in such a position as to put the first laminated metal plate 1 to the off and on positions.

(e) When the temperature exceeds the second off temperature, the second laminated metal plate 2 thermally deforms in such a shape as to maintain the first laminated metal plate 1 in the off position.

(f) When the temperature falls below the second return temperature, the second laminated metal plate thermally deforms in such a shape as to return the first laminated metal plate 1 to the on position.

(g) The second off temperature is higher than the first off temperature and the second return temperature is lower than the first return temperature.

(h) When the temperature exceeds the first off temperature, the first laminated metal plate 1 becomes in the off position and when the temperature exceeds the second off temperature, the second laminated metal plate 2 maintains the first laminated metal plate 1 in the off state.

(i) When the thermostat is heated to the temperature between the first and second off temperatures, the first laminated metal plate 1 becomes in the off position. In this state, the first laminated metal plate 1 returns to the on position when the ambient temperature falls below the first return temperature.

(j) When the temperature exceeds the second off temperature, the second laminated metal plate 2 thermally deforms in such a shape as to maintain the first laminated metal plate 1 in the off position. In this state, the first laminated metal plate 1 does not return to the on position even if the temperature falls to the temperature between the first and second return temperatures. However, it returns the first laminated metal plate 1 to the on position when the temperature falls below the second return temperature.

A thermostat having the above-mentioned structures has the features that the structures are extremely simple and the thermostat return temperature when the ambient temperature drops after it has reached a high temperature and current has been cut off can be varied depending on the rising temperature. This is because the thermostat comprises the first laminated metal plate and the second laminated metal plate in which a plurality of metal layers having different rates of expansion are laminated, the first laminated metal plate is provided with the movable contact, the second laminated metal plate is disposed in such a position as to put the first laminated metal plate in the off and on positions, and the first off temperature and the second off temperature, which put the first and second laminated metal plates in the off position by causing them to deform thermally, and the first return temperature and the second return temperature, which return the first and second laminated metal plates from the off position to the on position, are set respectively at different temperatures.

Further, in the thermostat, the second off temperature is higher than the first off temperature and the second return temperature is lower than the first return temperature. For this reason, when the ambient temperature exceeds the first off temperature, the first laminated metal plate becomes in the off position and cuts off current, and when the temperature falls below the first return temperature, the first laminated metal plate returns to the on position and turns on current. Still further, when the temperature exceeds the second off temperature, the first laminated metal plate does not return to the on position and current can be maintained in the cut-off state even if the temperature falls below the first return temperature because the second laminated metal plate maintains the first laminated metal plate in the off state. Therefore, the thermostat can firmly maintain current in the cut-off state after the temperature has risen abnormally. This thermostat can return the first laminated metal plate to the on position by returning the second laminated metal plate when the temperature falls to the second return temperature that is lower than the first return temperature.

Furthermore, the thermostat of the present invention can also comprise the first laminated metal plate 1 and the second laminated metal plate 2 having the following structures.

(a) The first laminated metal plate 1 having the movable contact 3 becomes in the on state by causing the movable contact 3 to come in contact with the fixed contact 4 and becomes in the off state by separating the movable contact 3 from the fixed contact 4.

(b) When the ambient temperature exceeds the first off temperature, the first laminated metal plate 1 thermally deforms in the direction which the movable contact 3 is separated from the fixed contact 4.

(c) When the temperature falls below the first return temperature, the first laminated metal plate 1 thermally deforms in the direction which the movable contact 3 comes in contact with the fixed contact 4.

(d) The second laminated metal plate 2 is disposed in such a position as to put the first laminated metal plate 1 in the off and on positions.

(e) When the temperature exceeds the second off temperature, the second laminated metal plate 2 causes the first laminated metal plate 1 to deform in the off position.

(f) When the temperature falls below the second return temperature, the second laminated metal plate 2 returns the first laminated metal plate 1 to the on position.

(g) The second off temperature is lower than the first off temperature and the second return temperature is higher than the first return temperature.

(h) When the temperature exceeds the second off temperature, the second laminated metal plate 2 puts the first laminated metal plate 1 in the off position, and when the temperature exceeds the first off temperature, the first laminated metal plate 2 thermally deforms by itself and becomes in the off position.

(i) When the thermostat is heated to the temperature between the first and second off temperatures, the second laminated metal plate 2 puts the first laminated metal plate 1 in the off position. In this state, the second laminated metal plate 2 returns and puts the first laminated metal plate 1 in the on position when the temperature falls below the second return temperature.

(j) When the temperature exceeds the first off temperature, the first laminated metal plate 1 thermally deforms in the off position. In this state, the first laminated metal plate 1 does not return to the on position even if the temperature falls to the temperature between the first and second return temperatures. However, the first laminated metal plate 1 thermally deforms and returns to the on position when the temperature falls below the first return temperature.

In this thermostat, the second off temperature is lower than the first off temperature and the second return temperature is higher than the first return temperature. For this reason, when the ambient temperature exceeds the second off temperature, the second laminated metal plate puts the first laminated metal plate in the off position and cuts off current, and when the temperature falls below the second return temperature, the second laminated metal plate returns the first laminated metal plate to the on position and turns on current. Further, when the temperature exceeds the first off temperature, the first laminated metal plate deforms by itself and becomes in the off position. Therefore, the first laminated metal plate does not return to the on position and current can be maintained in the cut-off state even if the second laminated metal plate returns to the on position when the temperature falls below the second return temperature. This thermostat can return the first laminated metal plate to the on position when the temperature falls to the first return temperature that is lower than the second return temperature.

As mentioned above, the thermostat of the present invention can be simplified In construction by the first and second laminated metal plates having special structures, and distinguish the cut-off and turned-on states of current and control them depending on the rising temperature. Therefore, the thermostat of the present invention can realize the features that miniaturization can be obtained by decreasing the number of parts compared with a prior art thermostat, and a large quantity of production at low cost can be obtained by reducing manufacturing steps. Furthermore, the thermostat of the present invention has the feature that the current cutoff state can be ideally controlled by setting the first and second off temperatures and the first and second return temperatures at suitable temperatures for the purposes, and it is possible to provide superior products in safety.

Further, the above-mentioned thermostat has another feature that deterioration of thermal deformation materials caused by repetition of being heated can be drastically reduced, and the long-term high reliability and safety are guaranteed unlike a prior art thermostat using thermal deformation materials. This is because the current cut-off and turned-on states are controlled by utilizing the first and second laminated metal plate thermal deformation.

Still further, the above-mentioned thermostat has another feature that it is possible to repeatedly test the first and second laminated metal plates for the temperature when current is cut off and turned on since the first and second laminated metal plates return to their original shapes at set temperatures. Thus, the thermostat in which the temperature test can be repeatedly conducted can improve the quality and raise the reliability.

The battery pack of the present invention contains the above-mentioned thermostat which cuts off current flowing to the batteries when the battery temperature reaches a high temperature.

In this battery pack, when the battery temperature rises to the first off temperature or the second off temperature, the thermostat cuts off current flowing to the batteries, and then it returns to the on state and turns on current when the temperature drops. For this reason, when the battery temperature reaches a high temperature, the thermostat cuts off current and prevents the temperature from becoming even higher than the high temperature. However, the thermostat returns the battery pack to a usable state after the temperature has fallen and the battery pack has become safe to use. Thus, the battery pack can return to the usable state without exchanging any parts unlike a fuse when the battery temperature fails to the battery pack usable temperature after the temperature has reached a high temperature.

Furthermore, in the battery pack described above, the thermostat can be so structured as not to easily return to the on state after current has been cut off by an abnormal rise in temperature which is caused by being over-charged or over-discharged in extreme situations, being used in shorted electric appliances or being used in extremely over-loaded situations. For this reason, the battery pack has the feature that it is extremely safe to use because current is maintained in the cut-off even if the battery temperature falls after the battery pack has been used in dangerous situations.

DETAILED DESCRIPTION OF THE INVENTION

Figure 1:
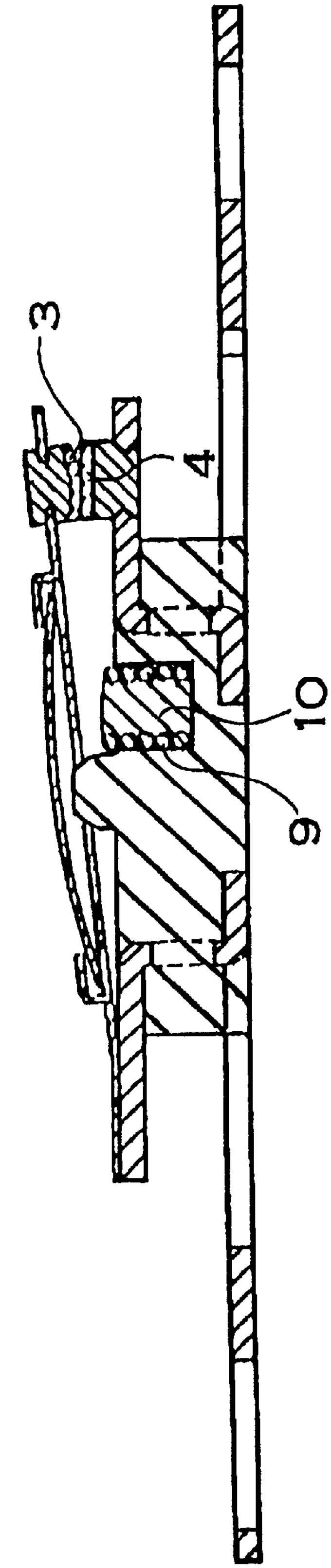
FIG. 1 PRIOR ART
FIG. 1 is a cross-section view of a prior art thermostat.
Figure 2:
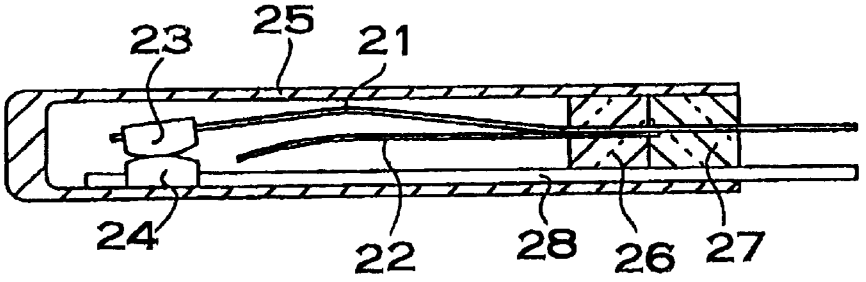
FIG. 2 is a cross-section view of an embodiment of the thermostat of the present invention.
Figure 3:
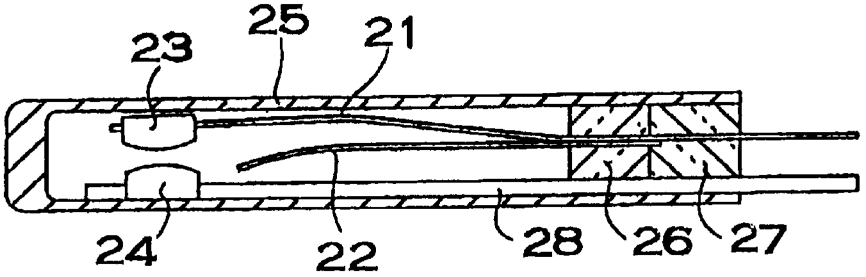
FIG. 3 is a cross-section view showing thermal deformation of the first laminated metal plate of the thermostat shown in FIG. 2.
Figure 4:
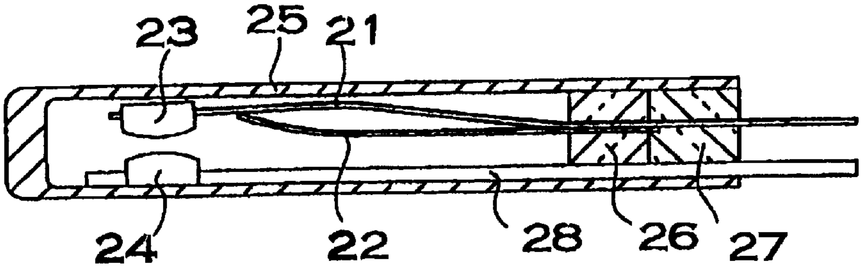
FIG. 4 is a cross-section view showing thermal deformation of the second laminated metal plate of the thermostat shown in FIG. 3.

A thermostat shown in FIGS. 2 to 4 contains a first laminated metal plate 21 and a second laminated metal plate 22 in a case 25. The case 25, which is an insulator such as plastic or a metal whose inside is coated by an insulator, is formed in a slender cylindrical shape that is opened at one end. An opening part of the case 25 is closed by insulating fixing materials 26. The first and second laminated metal plates 21, 22 are sandwiched between the insulating fixing materials 26 and fixed in predetermined positions within the case 25. Further, in the thermostat shown in these figures, sealing material 27 is applied to the outside of the insulating fixing materials 26 to close the opening part of the case 25 in a water-tight state.

The first and second laminated metal plates 21, 22 are metal plates in which a plurality of metal layers having different rates of expansion are laminated, so they deform differently depending on a temperature due to the difference rates of expansion The first and second laminated metal plates 21, 22 are bimetals in which two metal layers having different rates of expansion are laminated or trimetals in which three metal layers having different rates of expansion are laminated.

The first and second laminated metal plates 21, 22, which are formed in a slender plate-shape, are fixed by being sandwiched between the insulating fixing materials 26 at the right end in the figures. In the thermostat shown in the figures, the first and second laminated metal plates 21, 22 are superposed and sandwiched between the insulating fixing materials 26, and housed in the case 25 in such a manner which the second laminated metal plate 22 can put the first laminated metal plate 21 in the off and on positions. A movable contact 23 is fixed to the end of the first laminated metal plate 21. A fixed contact 24 is disposed in such a position as to oppose to the movable contact 23. The fixed contact 4 is disposed in a predetermined position of the case 25 through a lead 28. The lead 28 is sandwiched between the insulating fixing material 26 and the case 25 and fixed on the inner surface of the case 25.

The second laminated metal plate 22 is shorter than the first laminated metal plate 21 and disposed in a nearer position to the fixed contact 24 than the first laminated metal plate 21. This is because the second laminated metal plate 22 pushes the first laminated metal plate 21 and puts it in the off position.

When the ambient temperature exceeds the first off temperature, the first laminated metal plate 21 thermally deforms in the direction which the movable contact 23 separates from the fixed contact 24, separates the movable contact 23 from the fixed contact 24, and puts the movable contact 23 in the off position. Further, when the temperature falls below the first return temperature, a thermal deformation force acts on the first laminated metal plate 21 in the direction which the movable contact 23 comes in contact with the fixed contact 24. Therefore, when the temperature falls below the first return temperature, the movable contact 23 comes in contact with the fixed contact 24 unless the first laminated metal plate 21 returning action is restricted by the second laminated metal plate 22. However, when the first laminated metal plate 21 is maintained in the off position by the second laminated metal plate 22, the movable contact 23 does not come in contact with the fixed contact 24 even if the temperature falls below the first return temperature.

The first return temperature is set at a lower temperature than the first off temperature. For example, the first return temperature is set at approximately 40° C. when the first off temperature is set at approximately 80° C. In this thermostat, when the ambient temperature exceeds 80° C., the first laminated metal plate 21 separates the movable contact 23 from the fixed contact 24 and becomes in the off position, and when the temperature falls below 40° C., the first laminated metal plate 21 causes the movable contact 23 to come in contact with the fixed contact 24 and returns to the on position. However, the first laminated metal plate 21 returns to the on position when the temperature falls below 40° C. in such a case which the first laminated metal plate 21 is not maintained in the off state by the second laminated metal plate 22.

The second laminated metal plate 22 thermally deforms in such a shape as to maintain the first laminated metal plate 21 in the off position when the ambient temperature exceeds the second off temperature. Further, the second laminated metal plate 22 thermally deforms in such a shape as to return the first laminated metal plate 21 to the on position when the temperature falls below the second return temperature. The second off temperature is set at a higher temperature than the first off temperature and the second return temperature is set at a lower temperature than the first return temperature. For example, the second off temperature is set at approximately 100° C. and the second return temperature is set at considerably lower temperature than a usual temperature range, for instance, at −20° C.

The thermostat having these structures acts as shown in FIGS. 2 to 4.

(1) When the ambient temperature is lower than the first off temperature, as shown in FIG. 2, the first laminated metal plate 21 causes the movable contact 23 to come in contact with the fixed contact 24 and becomes in the on position.

(2) When the temperature rises up to the temperature between the first and second off temperatures, as shown in FIG. 3, the first laminated metal plate 21 deforms, separates the movable contact 23 from the fixed contact 24, and becomes in the off position. In this state, the second laminated metal plate 22 does not thermally deform in such a shape as to maintain the first laminated metal plate 21 in the off position. Therefore, when the temperature falls below the first return temperature, the first laminated metal plate 21 returns to the on position shown in FIG. 2, that is, the position in which the movable contact 23 comes in contact with the fixed contact 24.

(3) When the temperature exceeds the second off temperature, as shown in FIG. 4, the second laminated metal plate 22 thermally deforms in such a shape as to maintain the first laminated metal plate 21 in the off position. Once the second laminated metal plate 22 thermally deforms in this shape, it is maintained in the shape until the temperature falls below the second return temperature of the second laminated metal plate 22. The first laminated metal plate 21 does not return from the off position to the on position in practical situations when the second return temperature of the second laminated metal plate 22 is set at considerably lower temperature than a usual temperature, for example, at −20° C.

However, when the thermostat is compulsorily cooled and the ambient temperature falls below the second return temperature of −20° C., the second laminated metal plate 22 ceases maintaining the first laminated metal plate 21 in the off position and thereby the first laminated metal plate 21 returns to the on position.

Figure 5:
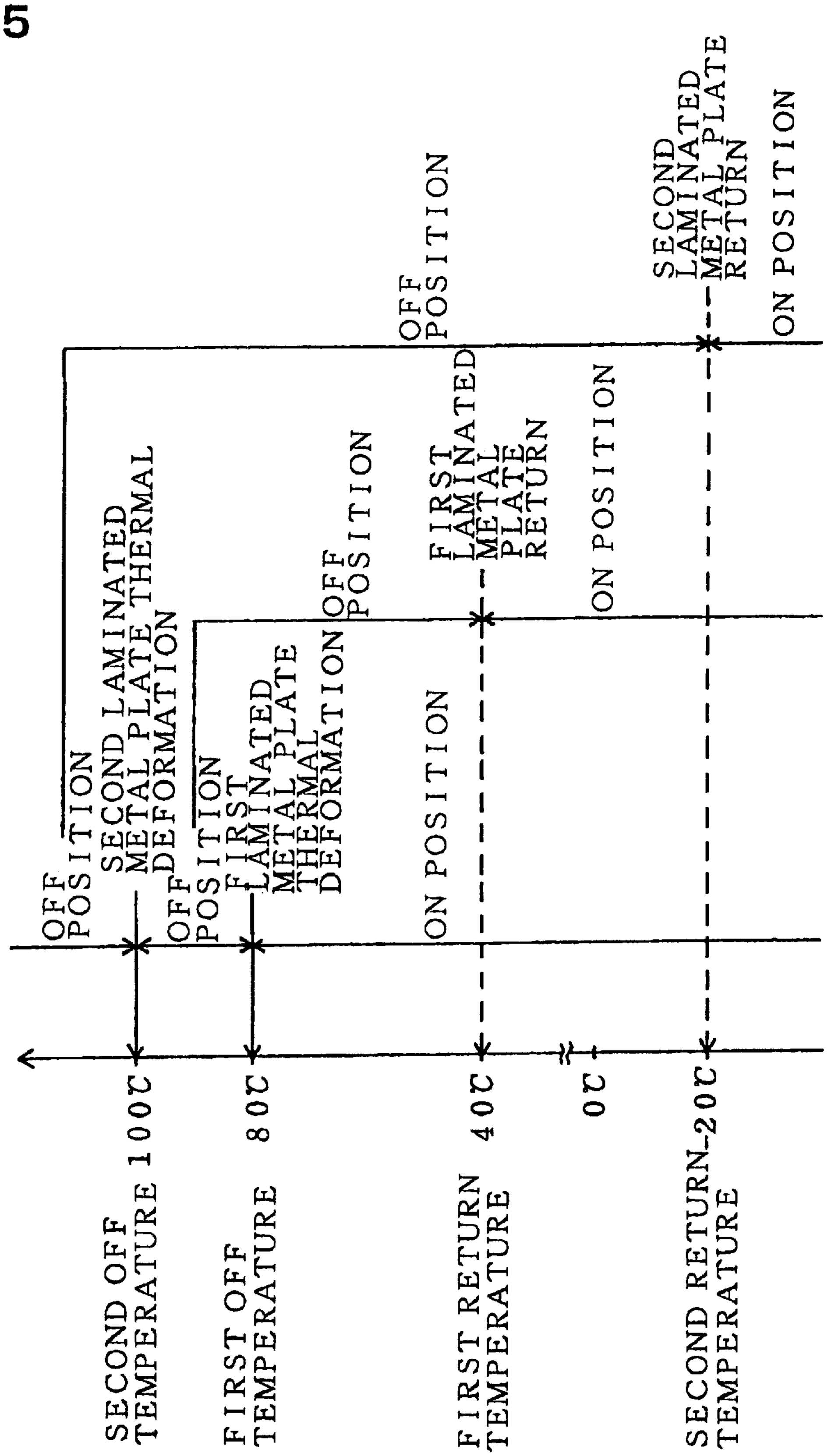
FIG. 5 is a chart showing current cut-off by the thermostat shown in FIGS. 2 to 4.

The action of above-mentioned thermostat is shown in a graph of FIG. 5. As shown in this graph, the thermostat is in the on position when the ambient temperature is lower than the first off temperature and returns to the on position when the temperature falls below the first return temperature after it has risen to the temperature between the first and second off temperatures. However, once the temperature has exceeded the second off temperature, the thermostat does not return to the on position unless it is cooled down to a lower temperature than the second return temperature. For this reason, the thermostat can be so designed as not to return to the on position unless it is compulsorily cooled down to an extremely low temperature after the thermostat has been switched to the off position due to an abnormal rise in temperature.

In the above-mentioned thermostat, the second laminated metal plate 22 maintains the first laminated metal plate 21 in the off position. However, in the thermostat of the present invention, the first off temperature can be set at a higher temperature than the second off temperature, and the first return temperature can be set at a lower temperature than the second return temperature. In this thermostat, the second laminated metal plate 22 does not maintain the first laminated metal plate 21 in the off position. The second laminated metal plate 22 switches the first laminated metal plate 21 to the off position.

For example, the second off temperature is set at approximately 80° C., the second return temperature is set at approximately 40° C., the first off temperature is set at approximately 100° C. and the first return temperature is set at −20° C. The thermostat acts in the order of FIG. 6, FIG. 7 and FIG. 8 as the ambient temperature rises. The numbers of 35, 36, 37 and 38 show a case, an insulating fixing material, sealing material and a lead in these figures.

Figure 6:
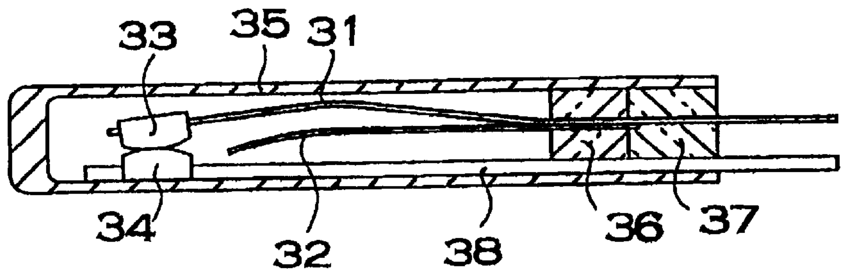
FIG. 6 is a cross-section view of another embodiment of the thermostat of the present invention.

(1) When the ambient temperature is lower than the second off temperature, as shown in FIG. 6, the first laminated metal plate 31 causes the movable contact 33 to come in contact with the fixed contact 34 and becomes in the on position.

Figure 7:
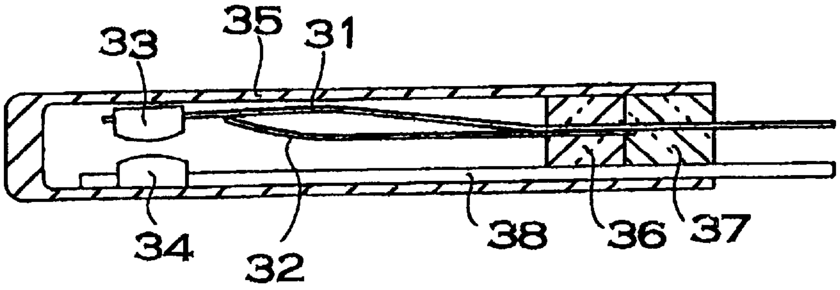
FIG. 7 is a cross-section view showing thermal deformation of the second laminated metal plate of the thermostat shown in FIG. 6.

(2) When the temperature rises up to the temperature between the first and second off temperatures, as shown in FIG. 7, the second laminated metal plate 32 deforms, separates the movable contact 33 from the fixed contact 34, and puts the first laminated metal plate 31 in the off position. In this temperature range, the first laminated metal plate 31 is pushed by the second laminated metal plate 32,and becomes in the off position. When the second laminated metal plate 32 ceases pushing the first laminated metal plate 31, the movable contact 33 comes in contact with the fixed contact 34. Therefore, when the ambient temperature falls below the second return temperature, the first faminated metal plate 31 returns to the on position shown in FIG. 2, that is, the position in which the movable contact 33 comes in contact with the fixed contact 34.

Figure 8:
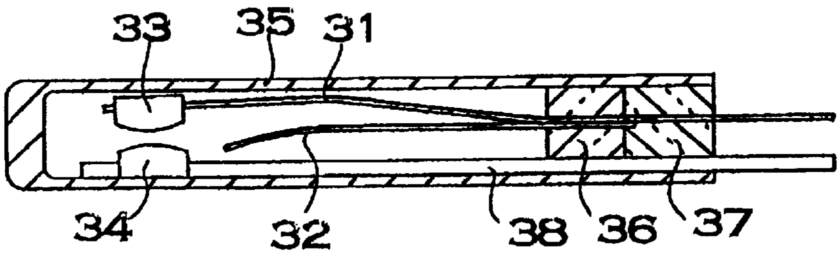
FIG. 8 is a cross-section view showing the second laminated metal plate returning in such a state which the first laminated metal plate of the thermostat shown in FIG. 7 has thermally deformed.

(3) When the temperature exceeds the first off temperature, the first laminated metal plate 31 thermally deforms by itself and maintains the movable contact 33 in a separated state from the fixed contact 34. Once the first laminated metal plate 31 deforms in this state, as shown in FIG. 8, the first laminated metal plate 31 maintains the movable contact 33 in the separated state from the fixed contact 34 even if the second laminated metal plate 32 returns to the on position when the temperature falls below the second return temperature of the second laminated metal plate 32. Also, once the first laminated metal plate 31 thermally deforms in this shape, it is maintained until the temperature falls below the first return temperature of the first laminated metal plate 31. The first laminated metal plate 31 does not return from the off position to the on position in practical situations when the first return temperature of the first laminated metal plate 31 is set at a considerably lower temperature than a usual temperature, for example, at −20° C.

However, when the thermostat is compulsorily cooled and the ambient temperature falls below the first return temperature of −20° C., the first laminated metal plate 31 causes the movable contact 33 to come in contact with the fixed contact 34 because the second laminated metal plate 32 does not push the first laminated metal plate 31 and becomes in the on position.

Figure 9:
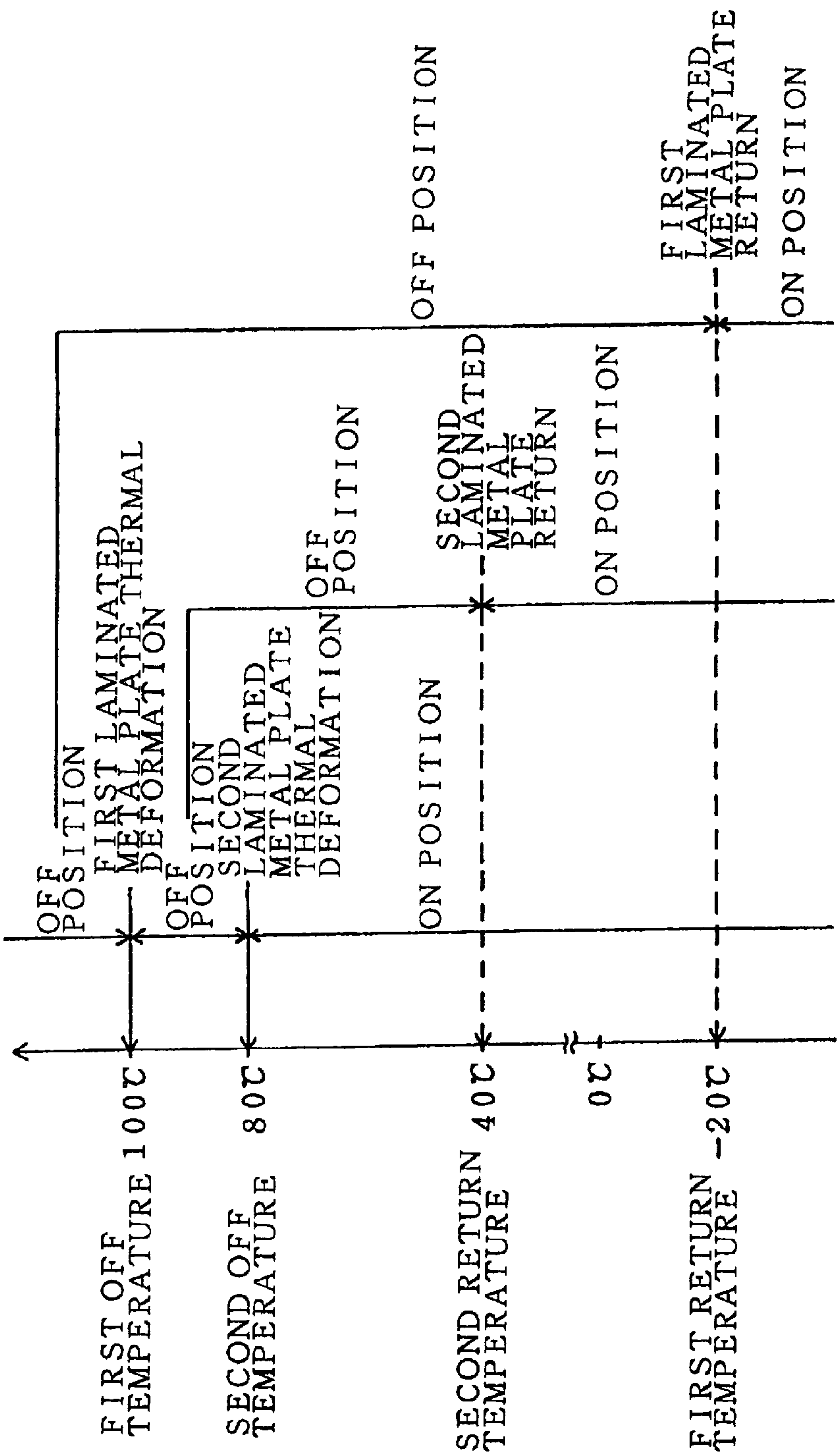
FIG. 9 is a chart showing current cut-off by the thermostat shown in FIGS. 6 to 8.

The action of this thermostat is shown in a graph of FIG. 9. As shown in the graph, the thermostat is in the on position when the ambient temperature is lower than the second off temperature and returns to the on position when the temperature falls below the second return temperature after it has risen to the temperature between the first and second off temperatures. However, once the temperature has exceeded the first off temperature, the thermostat does not return to the on position unless it is cooled down to a lower temperature than the first return temperature. For this reason, this thermostat can be designed so as not to return to the on position unless it is compulsorily cooled to an extremely low temperature after the thermostat has been switched to the off position due to an abnormal rise in temperature.

Figure 10:
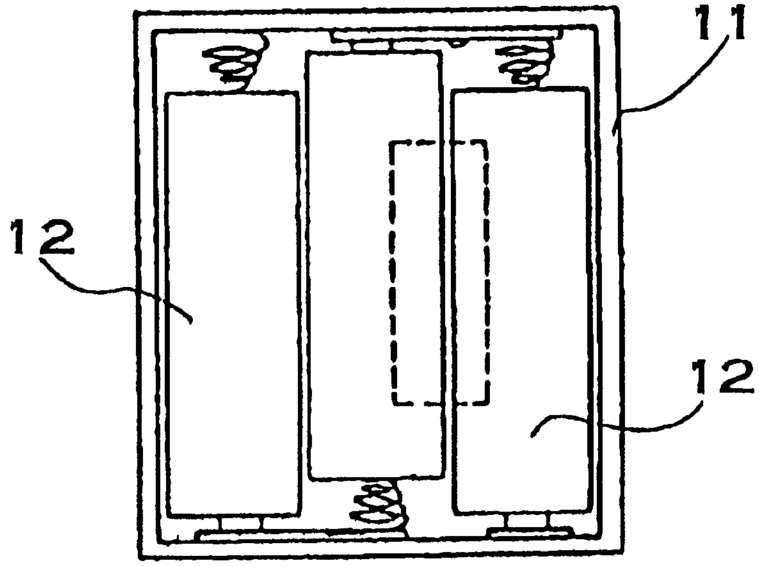
FIG. 10 is a plan view showing the inside of an embodiment of the battery pack of the present invention.

Further, in a battery pack shown in FIG. 10, a thermostat is connected in series with rechargeable batteries 12 housed in a case 11. The thermostat is, as shown by chain lines in the figure, disposed between the rechargeable batteries and in close proximity with the batteries. The thermostat, which is disposed in this place, detects the battery temperature and cuts off current flowing to the batteries when the battery temperature exceeds a set temperature. The thermostat is in the on position and does not cut off current when the battery temperature is low.

A thermostat housed in a battery pack is an above-mentioned thermostat which causes the first and second laminated metal plates 21, 22 to deform as shown in FIGS., 2 to 4 according as the battery temperature rises and which is switched to the off and on positions by the characteristics shown in FIG. 5, or an above-mentioned thermostat which causes the first and second laminated metal plates 31, 32 to deform in such positions as to be shown in FIGS. 6 to 8 according as the battery temperature rises and which is switched to the off and on positions by the characteristics shown in FIG. 9.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A thermostat causing a movable contact to come in contact with a fixed contact to become in the on state and separating the movable contact from the fixed contact to become in the off state comprising:

(a) a first laminated metal plate in which a plurality of metal layers having different rates of expansion are laminated, which separates the movable contact from the fixed contact and becomes in the off state when the ambient temperature exceeds the first off temperature, and which a thermal deformation force acts on in the direction which the movable contact comes in contact with the fixed contact when the temperature falls below the first return temperature; and (b) a second laminated metal plate in which a plurality of metal layers having different rates of expansion are laminated, which is disposed in such a position as to put the first laminated metal plate in the off and on positions, which thermally deforms in such a shape as to maintain the first laminated metal plate in the off position when the ambient temperature exceeds the second off temperature that is higher than the first off temperature, and which thermally deforms in such a shape as to return the first laminated metal plate to the on position when the temperature falls below the second return temperature that is lower than the first return temperature.

2. A thermostat as recited in claim 1 wherein the first laminated metal plate is a bimetal in which two metal layers having different rates of expansion are laminated.

3. A thermostat as recited in claim 1 wherein the first laminated metal plate is a trimetal in which three metal layers having different rates of expansion are laminated.

4. A thermostat as recited in claim 1 wherein the second laminated metal plate is a bimetal in which two metal layers having different rates of expansion are laminated.

5. A thermostat as recited in claim 1 wherein the second laminated metal plate is a trimetal in which three metal layers having different rates of expansion are laminated.

6. A thermostat as recited in claim 1 wherein the first laminated metal plate and the second laminated metal plate are formed in a slender plate-shape and fixed by being sandwiched between insulating fixing materials at one end, the movable contact is fixed to the end of the first laminated metal plate, and the fixed contact is disposed in such a position as to oppose to the movable contact.

7. A thermostat as recited in claim 6 wherein the second laminated metal plate is shorter than the first laminated metal plate, and the second laminated metal plate pushes the first laminated metal plate and puts the first laminated metal plate in the off position.

8. A thermostat causing a movable contact to come in contact with a fixed contact to become in the on state and separating the movable contact from the fixed contact to become in the off state comprising:

(a) a first laminated metal plate in which a plurality of metal layers having different rates of expansion are laminated, which separates the movable contact from the fixed contact and becomes in the off position when the ambient temperature exceeds the first off temperature, and which thermally deforms in the direction which the movable contact comes in contact with the fixed contact when the temperature falls below the first return temperature; and (b) a second laminated metal plate in which a plurality of metal layers having different rates of expansion are laminated, which is disposed in such a position as to put the first laminated metal plate in the off and on positions, which thermally deforms in such a shape as to cause the first laminated metal plate to deform in the off position when the ambient temperature exceeds the second off temperature that is lower than the first off temperature, which thermally deforms in such a shape as to return the first laminated metal plate to the on position when the temperature falls below the second return temperature that is higher than the first return temperature.

9. A thermostat as recited in claim 8 wherein the first laminated metal plate is a bimetal in which two metal layers having different rates of expansion are laminated.

10. A thermostat as recited in claim 8 wherein the first laminated metal plate is a trimetal in which three metal layers having different rates of expansion are laminated.

11. A thermostat as recited in claim 8 wherein the second laminated metal plate is a bimetal in which two metal layers having different rates of expansion are laminated.

12. A thermostat as recited in claim 8 wherein the second laminated metal plate is a trimetal in which three metal layers having different rates of expansion are laminated.

13. A thermostat as recited in claim 8 wherein the first laminated metal plate and the second laminated metal plate are formed in a slender plate-shape and fixed by being sandwiched between insulating fixing materials at one end, the movable contact is fixed to the end of the first laminated metal plate, and the fixed contact is disposed in such a position as to oppose to the movable contact.

14. A thermostat as recited in claim 13 wherein the second laminated metal plate is shorter than the first laminated metal plate, and the second laminated metal plate pushes the first laminated metal plate and puts the first laminated metal plate in the off position.

15. A battery pack comprising a thermostat causing a movable contact to come in contact with a fixed contact to become in the on state and separating the movable contact from the fixed contact to become in the off state having:

(a) a first laminated metal plate in which a plurality of metal layers having different rates of expansion are laminated, which separates the movable contact from the fixed contact and becomes in the off position when the ambient temperature exceeds the first off temperature, and which a thermal deformation force acts on in the direction which the movable contact comes in contact with the fixed contact when the temperature falls below the first return temperature; and (b) a second laminated metal plate in which a plurality of metal layers having different rates of expansion are laminated, which is disposed in such a position as to put the first laminated metal plate in the off and on positions, which thermally deforms in such a shape as to maintain the first laminated metal plate in the off position when the ambient temperature exceeds the second off temperature that is higher than the first off temperature, which thermally deforms in such a shape as to return the first laminated metal plate to the on position when the temperature falls below the second return temperature that is lower than the first return temperature.

16. A battery pack as recited in claim 15 wherein the first laminated metal plate of the thermostat is a bimetal in which two metal layers having different rates of expansion are laminated.

17. A battery pack as recited in claim 15 wherein the first laminated metal plate of the thermostat is a trimetal in which three metal layers having different rates of expansion are laminated.

18. A battery pack as recited in claim 15 wherein the second laminated metal plate of the thermostat is a bimetal in which two metal layers having different rates of expansion are laminated.

19. A battery pack as recited in claim 15 wherein the second laminated metal plate of the thermostat is a trimetal in which three metal layers having different rates of expansion are laminated.

20. A battery pack as recited in claim 15 wherein the first laminated metal plate and the second laminated metal plate of the thermostat are formed in a slender plate-shape and fixed by being sandwiched between insulating fixing materials at one end, the movable contact is fixed to the end of the first laminated metal plate, and the fixed contact is disposed in such a position as to oppose to the movable contact.

21. A battery pack as recited in claim 20 wherein the second laminated metal plate of the thermostat is shorter than the first laminated metal plate, and the second laminated metal plate pushes the first laminated metal plate and puts the first laminated metal plate in the off position.

22. A battery pack comprising a thermostat causing a movable contact to come in contact with a fixed contact to become in the on state and separating the movable contact from the fixed contact to become in the off state having:

(a) a first laminated metal plate in which a plurality of metal layers having different rates of expansion are laminated, which separates the movable contact from the fixed contact and becomes in the off state when the ambient temperature exceeds the first off temperature, and which thermally deforms in the direction which the movable contact comes in contact with the fixed contact when the temperature falls below the first return temperature; and (b) a second laminated metal plate in which a plurality of metal layers having different rates of expansion are laminated, which is disposed in such a position as to put the first laminated metal plate in the off and on positions, which thermally deforms in such a shape as to cause the first laminated metal plate to deform in the off position when the ambient temperature exceeds the second off temperature that is lower than the first off temperature, which thermally deforms in such a shape as to return the first laminated metal plate to the on position when the temperature falls below the second return temperature that is higher than the first return temperature.

23. A battery pack as recited in claim 22 wherein the first laminated metal plate of the thermostat is a bimetal in which two metal layers having different rates of expansion are laminated.

24. A battery pack as recited in claim 22 wherein the first laminated metal plate of the thermostat is a trimetal in which three metal layers having different rates of expansion are laminated.

25. A battery pack as recited in claim 22 wherein the second laminated metal plate of the thermostat is a bimetal in which two metal layers having different rates of expansion are laminated.

26. A battery pack as recited in claim 22 wherein the second laminated metal plate of the thermostat is a trimetal in which three metal layers having different rates of expansion are laminated.

27. A battery pack as recited in claim 22 wherein the first laminated metal plate and the second laminated metal plate of the thermostat are formed in a slender plate-shape and fixed by being sandwiched between insulating fixing materials at one end, the movable contact is fixed to the end of the first laminated metal plate, and the fixed contact is disposed in such a position as to oppose to the movable contact.

28. A battery pack as recited in claim 27 wherein the second laminated metal plate of the thermostat is shorter than the first laminated metal plate, and the second laminated metal plate pushes the first laminated metal plate and puts the first laminated metal plate in the off position.

* * * * *